US012266490B2

(12) United States Patent
Dauksas et al.

(10) Patent No.: US 12,266,490 B2
(45) Date of Patent: Apr. 1, 2025

(54) MODULAR RECLOSER

(71) Applicant: G & W ELECTRIC COMPANY, Bolingbrook, IL (US)

(72) Inventors: Arturas Dauksas, Oak Lawn, IL (US); Vincent Marec, Bolingbrook, IL (US); Janet Ache, Bolingbrook, IL (US); Blair S. Kerr, Downers Grove, IL (US)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 565 days.

(21) Appl. No.: 17/606,373

(22) PCT Filed: Apr. 24, 2020

(86) PCT No.: PCT/US2020/029865
§ 371 (c)(1),
(2) Date: Oct. 25, 2021

(87) PCT Pub. No.: WO2020/219914
PCT Pub. Date: Oct. 29, 2020

(65) Prior Publication Data

US 2022/0208491 A1 Jun. 30, 2022

Related U.S. Application Data

(60) Provisional application No. 62/882,060, filed on Aug. 2, 2019, provisional application No. 62/839,278, filed on Apr. 26, 2019.

(51) Int. Cl.
*H01H 33/662* (2006.01)
*H01H 33/666* (2006.01)
(Continued)

(52) U.S. Cl.
CPC .. *H01H 33/66207* (2013.01); *H01H 33/6662* (2013.01); *H01H 50/02* (2013.01); *H01H 50/16* (2013.01)

(58) Field of Classification Search
CPC ......... H01H 33/66207; H01H 33/6662; H01H 50/02; H01H 50/16; H01H 33/027; H01H 2033/6665
See application file for complete search history.

(56) References Cited

U.S. PATENT DOCUMENTS 972,048 A 10/1910 York
2,140,371 A 12/1938 Joseph et al.
(Continued)

FOREIGN PATENT DOCUMENTS

CN 2809846 Y 8/2006
CN 101290846 B 8/2011
(Continued)

OTHER PUBLICATIONS

European Office Extended European Search Report for application 20796401.6, dated Dec. 12, 2022 (8 pages).
(Continued)

*Primary Examiner* — Mohamad A Musleh
(74) *Attorney, Agent, or Firm* — Michael Best & Friedrich LLP

(57) ABSTRACT

A switchgear apparatus includes a vacuum interrupter assembly having a movable contact and a stationary contact, a main housing surrounding the vacuum interrupter assembly, and a first terminal electrically coupled to one of the movable contact and the stationary contact, the first terminal extending from the main housing along a first axis. The switchgear apparatus also includes a second terminal electrically coupled to the other of the movable contact and the stationary contact, the second terminal extending from the main housing along a second axis, and a mounting head couplable to the main housing in a plurality of orientations about the first axis.

20 Claims, 10 Drawing Sheets

(51) Int. Cl.
*H01H 50/02* (2006.01)
*H01H 50/16* (2006.01)

(56) References Cited

U.S. PATENT DOCUMENTS

| | | | |
|---|---|---|---|
| 2,875,381 A | 2/1959 | Chabala | |
| 3,320,377 A | 5/1967 | Yonkers | |
| 3,956,721 A | 5/1976 | Link | |
| 4,124,790 A | 11/1978 | Kumbera et al. | |
| 4,283,610 A | 8/1981 | Date et al. | |
| 4,527,028 A | 7/1985 | Luehring | |
| 4,568,804 A | 2/1986 | Luehring | |
| 4,880,947 A | 11/1989 | Fey et al. | |
| 4,950,854 A | 8/1990 | Green | |
| 5,004,877 A | 4/1991 | Yin | |
| 5,091,616 A | 2/1992 | Ramos et al. | |
| 5,175,403 A | 12/1992 | Hamm et al. | |
| 5,321,221 A * | 6/1994 | Rozier | H01H 33/127 218/2 |
| 5,597,992 A | 1/1997 | Walker | |
| 5,753,876 A | 5/1998 | Lanning | |
| 5,808,258 A | 9/1998 | Luzzi | |
| 5,834,725 A | 11/1998 | Clarke et al. | |
| 5,912,604 A | 6/1999 | Harvey et al. | |
| 6,130,394 A | 10/2000 | Hoegl | |
| 6,198,062 B1 | 3/2001 | Mather et al. | |
| 6,268,579 B1 | 7/2001 | Kajiwara et al. | |
| 6,888,086 B2 | 5/2005 | Daharsh et al. | |
| 6,989,498 B1 | 1/2006 | Linder et al. | |
| 7,053,327 B2 | 5/2006 | Benk et al. | |
| 7,215,228 B2 | 5/2007 | Rhein | |
| 7,488,916 B2 | 2/2009 | Muench et al. | |
| 7,563,161 B2 | 7/2009 | Perret et al. | |
| 7,772,515 B2 | 8/2010 | Stoving et al. | |
| 8,035,054 B2 | 10/2011 | Ozawa et al. | |
| 8,178,812 B2 | 5/2012 | Martin et al. | |
| 8,269,130 B2 | 9/2012 | Mangan et al. | |
| 8,272,127 B2 | 9/2012 | Kowalyshen et al. | |
| 8,378,242 B2 | 2/2013 | Kim | |
| 8,674,254 B2 | 3/2014 | Borgstrom | |
| 8,729,416 B2 | 5/2014 | Bullock et al. | |
| 8,772,666 B2 | 7/2014 | Darko et al. | |
| 8,785,802 B2 | 7/2014 | Shang | |
| 8,796,570 B2 | 8/2014 | Kobayashi et al. | |
| 8,933,358 B2 | 1/2015 | Yang | |
| 9,070,517 B2 | 6/2015 | Bullock et al. | |
| 9,177,742 B2 | 11/2015 | Ache et al. | |
| 9,190,231 B2 | 11/2015 | Borgstrom et al. | |
| 9,208,962 B2 | 12/2015 | Bose et al. | |
| 9,275,807 B2 | 3/2016 | Darko et al. | |
| 9,543,081 B2 | 1/2017 | Ozil et al. | |
| 9,633,802 B2 | 4/2017 | Chapelle et al. | |
| 9,633,807 B2 | 4/2017 | Ache et al. | |
| 9,640,350 B2 | 5/2017 | Stoving et al. | |
| 9,659,728 B2 | 5/2017 | Martin et al. | |
| 9,685,280 B2 | 6/2017 | Benson et al. | |
| 9,685,283 B2 | 6/2017 | Darko et al. | |
| 9,953,772 B2 | 4/2018 | Korves et al. | |
| 10,074,496 B2 | 9/2018 | Lamara et al. | |
| 10,115,547 B2 | 10/2018 | Gerovac et al. | |
| 2001/0025829 A1 | 10/2001 | Marin-pache et al. | |
| 2005/0082260 A1 | 4/2005 | Martin et al. | |
| 2006/0231529 A1 | 10/2006 | Daharsh et al. | |
| 2008/0087647 A1 | 5/2008 | Volkmar | |
| 2010/0000972 A1 | 1/2010 | Bodenstein et al. | |
| 2010/0089874 A1 | 4/2010 | Morita et al. | |
| 2010/0276395 A1 | 11/2010 | Gardner | |
| 2012/0261384 A1 | 10/2012 | Labianco et al. | |
| 2013/0187732 A1 | 7/2013 | Bullock et al. | |
| 2014/0138357 A1 | 5/2014 | Kasza et al. | |
| 2015/0221464 A1 | 8/2015 | Gentsch et al. | |
| 2015/0262768 A1 | 9/2015 | Siebens et al. | |
| 2015/0311009 A1 | 10/2015 | Ding et al. | |
| 2015/0332883 A1 | 11/2015 | Benke | |
| 2016/0005560 A1 | 1/2016 | Ache et al. | |
| 2016/0012994 A1 | 1/2016 | Boffelli et al. | |
| 2016/0126037 A1 | 5/2016 | Gerovac et al. | |
| 2016/0141117 A1 | 5/2016 | Ashteka et al. | |
| 2017/0207039 A1 | 7/2017 | Pohle | |
| 2019/0259554 A1 | 8/2019 | Hillmann | |

FOREIGN PATENT DOCUMENTS

| | | | | |
|---|---|---|---|---|
| CN | 206135272 U | 4/2017 | |
| CN | 109449042 A | 3/2019 | |
| EP | 1120804 A1 | 8/2001 | |
| EP | 1482528 A2 | 12/2004 | |
| EP | 1811536 A1 * | 7/2007 | H01F 7/1615 |
| EP | 2859567 B1 | 8/2018 | |
| GB | 391771 A | 4/1933 | |
| JP | 3969344 B2 | 9/2007 | |
| WO | WO1990001788 A1 | 2/1990 | |
| WO | WO2000041199 A1 | 7/2000 | |
| WO | WO2002069352 A1 | 9/2002 | |
| WO | WO2009098122 A1 | 8/2009 | |
| WO | WO2010058025 A1 | 5/2010 | |
| WO | WO2011075931 A1 | 6/2011 | |
| WO | 2013187886 A2 | 12/2013 | |
| WO | WO2019133611 A1 | 7/2019 | |

OTHER PUBLICATIONS

International Preliminary Report on Patentability for Application No. PCT/US2020/029841 dated Nov. 21, 2021 (10 pages).
International Search Report and Written Opinion for Application No. PCT/US2020/029841 dated Aug. 14, 2020 (13 pages).
International Preliminary Report on Patentability for Application No. PCT/US2020/029850 dated Nov. 4, 2021 (7 pages).
International Search Report and Written Opinion for Application No. PCT/US2020/029850 dated Aug. 14, 2020 (10 pages).
International Preliminary Report on Patentability for Application No. PCT/US2020/029865 dated Nov. 4, 2021 (7 pages).
International Search Report and Written Opinion for Application No. PCT/US2020/029865 dated Aug. 14, 2020 (11 pages).
International Preliminary Report on Patentability for Application No. PCT/US2020/029868 dated Nov. 4, 2021 (7 pages).
International Search Report and Written Opinion for Application No. PCT/US2020/029868 dated Aug. 14, 2020 (10 pages).
G&W Electric, "Viper-ST," Catalog O-vst14, dated Nov. 2014 (12 pages).
G&W Electric, "Viper-SP," Catalog VSP10, dated Jun. 2010 (8 pages).

* cited by examiner

MODULAR RECLOSER

CROSS-REFERENCE TO RELATED APPLICATIONS

This application claims priority to U.S. Provisional Patent Application No. 62/839,278, filed on Apr. 26, 2019, and to U.S. Provisional Patent Application No. 62/882,060, filed on Aug. 2, 2019, the entire contents of both of which are incorporated herein by reference.

FIELD OF THE DISCLOSURE

The present disclosure relates to solid dielectric switchgear, and more particularly to reclosers.

BACKGROUND OF THE DISCLOSURE

Reclosers are switchgear that provide line protection, for example, on overhead electrical power lines and/or substations and serve to segment the circuits into smaller sections, reducing the number of potentially impacted customers in the event of a short circuit. Previously, reclosers were controlled using hydraulics. More recently, solid dielectric reclosers have been developed for use at voltages up to 38 kV. Solid dielectric reclosers may be paired with electronic control devices to provide automation and "smart" recloser functionality.

SUMMARY OF THE DISCLOSURE

A need exists for fault protection and circuit segmentation in power transmission circuits, which typically operate at higher voltages (e.g., up to 1,100 kV). Reclosers allow for multiple automated attempts to clear temporary faults on overhead lines. In power transmission systems, this function is typically achieved using circuit breakers in substations. The present disclosure provides a modular recloser that can operate at voltages up to 72.5 kV and that can be pole-mounted outside of a substation. By enabling the placement of reclosers outside the substation, the present disclosure advantageously enables over-current protection to be positioned closer to potential faults and thereby segment the portion of the power transmission circuit affected by the fault to a smaller section. This reduces the potential impact of a fault to a smaller number of customers or end users, improving the power transmission system's reliability.

The present disclosure provides, in one aspect, a switchgear apparatus including a vacuum interrupter assembly having a movable contact and a stationary contact, a main housing surrounding the vacuum interrupter assembly, and a first terminal electrically coupled to one of the movable contact and the stationary contact, the first terminal extending from the main housing along a first axis. The switchgear apparatus also includes a second terminal electrically coupled to the other of the movable contact and the stationary contact, the second terminal extending from the main housing along a second axis, and a mounting head couplable to the main housing in a plurality of orientations about the first axis.

The present disclosure provides, in another aspect, a switchgear apparatus and mounting bracket assembly that includes a switchgear apparatus. The switchgear apparatus includes a vacuum interrupter assembly having a movable contact and a stationary contact, a main housing surrounding the vacuum interrupter assembly, a first terminal electrically coupled to one of the movable contact and the stationary contact, the first terminal extending from the main housing along a first axis, a second terminal electrically coupled to the other of the movable contact and the stationary contact, the second terminal extending from the main housing along a second axis, and a mounting head selectively couplable to the main housing in a plurality of orientations. The switchgear apparatus and mounting bracket assembly also includes a mounting bracket coupled to the mounting head.

The present disclosure provides, in another aspect, a switchgear apparatus and mounting bracket assembly including a mounting bracket and a switchgear apparatus. The switchgear apparatus includes a vacuum interrupter assembly having a movable contact and a stationary contact, a main housing surrounding the vacuum interrupter assembly, a first terminal electrically coupled to one of the movable contact and the stationary contact, the first terminal extending from the main housing along a first axis, a second terminal electrically coupled to the other of the movable contact and the stationary contact, the second terminal extending from the main housing along a second axis, and a mounting head configured to be coupled to the mounting bracket such that the mounting bracket is configured to at least partially support the switchgear apparatus via the mounting head. The switchgear apparatus is configurable to position at least one of the first axis or the second axis in a plurality of different orientations with respect to the mounting bracket when the mounting head is coupled to the mounting bracket.

Other aspects of the invention will become apparent by consideration of the detailed description and accompanying drawings.

DETAILED DESCRIPTION

Before any embodiments are explained in detail, it is to be understood that the arrangements are not limited in application to the details of construction and arrangement of components set forth in the following description or illustrated in the following drawings. The invention is capable of other embodiments and of being practiced or of being carried out in various ways.

Figure 1:
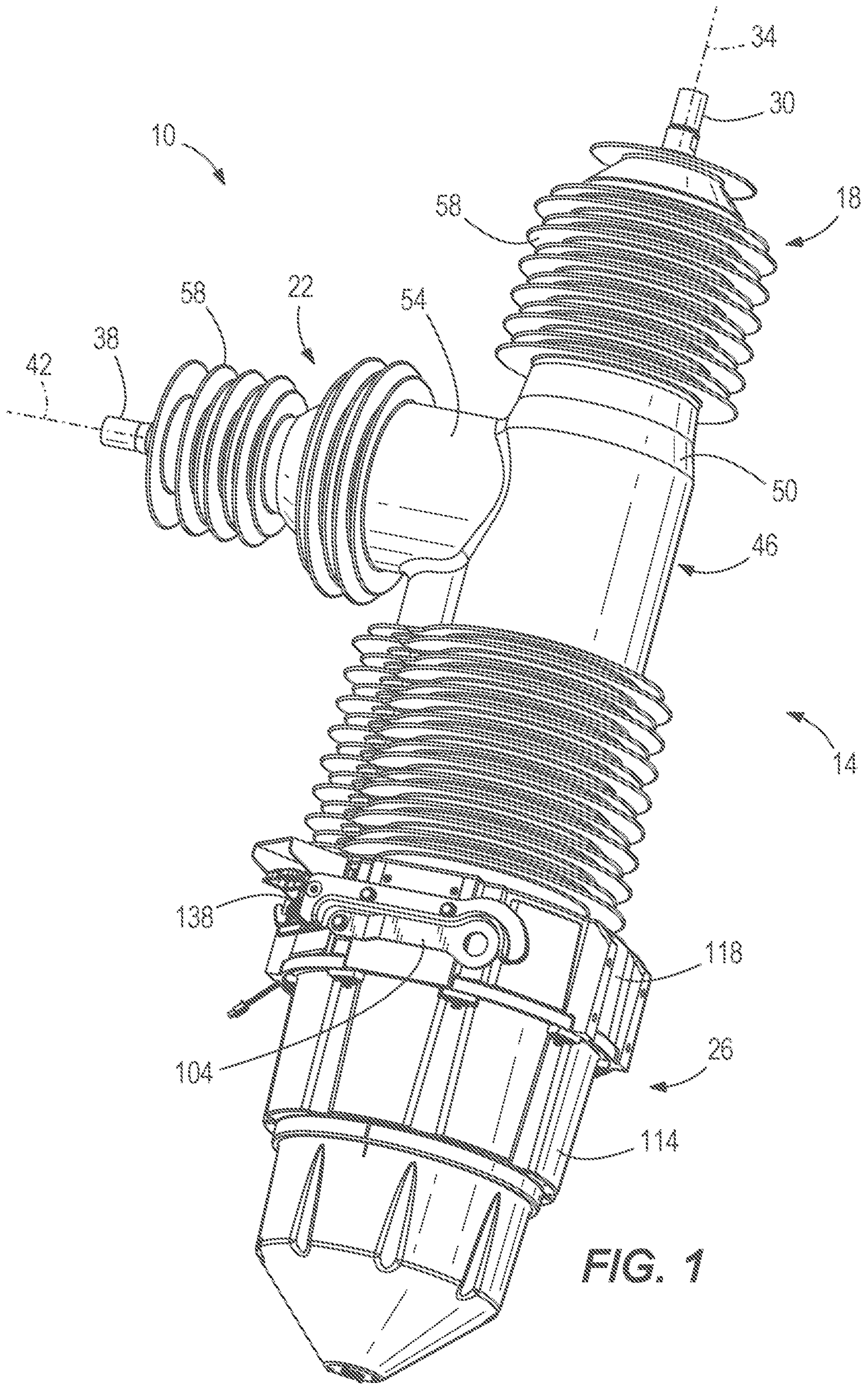
FIG. 1 is a perspective view of a recloser according to an embodiment of the present disclosure.

FIG. 1 illustrates a recloser 10 according to an embodiment of the present disclosure. The recloser 10 includes a housing assembly 14, a vacuum interrupter ("VI") assembly 18, a conductor assembly 22, which in some embodiments may be a load-side conductor assembly 22 and in other embodiments may be a source-side conductor assembly 22, and an actuator assembly 26. The VI assembly 18 includes a first terminal 30 extending from the housing assembly 14 along a first longitudinal axis 34, and the conductor assembly 22 includes a second terminal 38 extending from the housing assembly 14 along a second longitudinal axis 42 perpendicular to the first longitudinal axis 34. In other embodiments, the second longitudinal axis 42 may be obliquely oriented relative to the first longitudinal axis 34. As described in greater detail below, the actuator assembly 26 operates the VI assembly 18 to selectively break and/or reestablish a conductive pathway between the first and second terminals 30, 38. Although the recloser 10 is illustrated individually in FIG. 1, the recloser 10 may be part of a recloser system 10A (e.g., FIGS. 12-13) including a plurality of reclosers 10, each associated with a different phase of a three-phase power transmission system and ganged together such that operation of the plurality of reclosers 10 is synchronized. In some embodiments, the reclosers 10 of the recloser system 10A may be operable individually (i.e. the reclosers 10 may open and/or close independently from one another).

The illustrated housing assembly 14 includes a main housing 46 constructed from an insulating material, such as epoxy, that forms a solid dielectric module. For example, the main housing 46 can be constructed from a silicone or cycloaliphatic epoxy or a fiberglass molding compound. In the illustrated embodiment, the main housing 46 is covered with a silicone rubber layer that withstands heavily polluted environments and serves as a dielectric material for the recloser 10. The silicone rubber layer may be overmolded onto the main housing 46. In the illustrated embodiment, the main housing 46 includes a first bushing 50 that surrounds and at least partially encapsulates the VI assembly 18, and a second bushing 54 that surrounds and at least partially encapsulates the conductor assembly 22. The silicone rubber layer includes a plurality of sheds 58 extending radially outward from both bushings 50, 54. The first and second bushings 50, 54 are integrally formed together with the main housing 46 as a single monolithic structure in the illustrated embodiment. Alternatively, the first and second bushings 50, 54 may be formed separately and coupled to the main housing 46 in a variety of ways (e.g., via a threaded connection, snap-fit, etc.).

Figure 2:
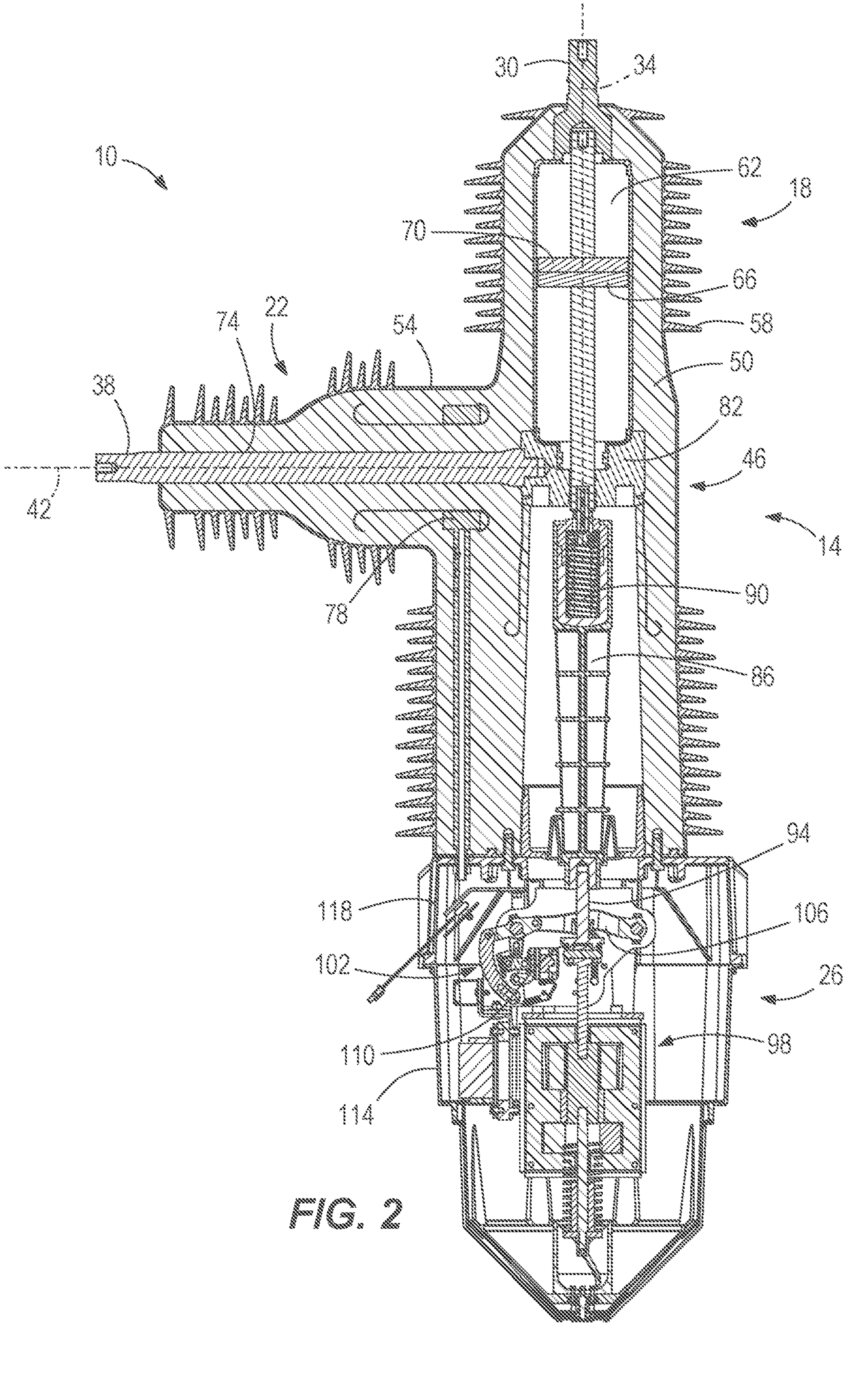
FIG. 2 is a cross-sectional view of the recloser of FIG. 1.

With reference to FIG. 2, the VI assembly 18 includes a vacuum bottle 62 at least partially molded within the first bushing 50 of the main housing 46. The vacuum bottle 62 encloses a movable contact 66 and a stationary contact 70 such that the movable contact 66 and the stationary contact 70 are hermetically sealed within the vacuum bottle 62. In some embodiments, the vacuum bottle 62 has an internal absolute pressure of about 1 millipascal or less. The movable contact 66 is movable along the first longitudinal axis 34 between a closed position (illustrated in FIG. 2) and an open position (not shown) to selectively establish or break contact with the stationary contact 70. The vacuum bottle 62 quickly suppresses electrical arcing that may occur when the contacts 66, 70 are opened due to the lack of conductive atmosphere within the bottle 62.

The conductor assembly 22 includes a conductor 74 and a sensor assembly 78, each at least partially molded within the second bushing 54 of the main housing 46. The sensor assembly 78 can include a current sensor, voltage sensor, partial discharge sensor, voltage indicated sensor, and/or other sensing devices. One end of the conductor 74 is electrically coupled to the movable contact 66 via a current interchange 82. The opposite end of the conductor 74 is electrically coupled to the second terminal 38. The first terminal 30 is electrically coupled to the stationary contact 70. The first terminal 30 and the second terminal 38 are configured for connection to respective electrical power transmission lines.

With continued reference to FIG. 2, the actuator assembly 26 includes a drive shaft 86 extending through the main housing 46 and coupled at one end to the movable contact 66 of the VI assembly 18. In the illustrated embodiment, the drive shaft 86 is coupled to the movable contact 66 via an encapsulated spring 90 to permit limited relative movement between the drive shaft 86 and the movable contact 66. The encapsulated spring 90 biases the movable contact 66 toward the stationary contact 70. The opposite end of the drive shaft 86 is coupled to an output shaft 94 of an electromagnetic actuator 98. The electromagnetic actuator 98 is operable to move the drive shaft 86 along the first longitudinal axis 34 and thereby move the movable contact 66 relative to the stationary contact 70. In additional or alternative embodiments, the functionality provided by the encapsulated spring 90 may be provided with an external spring and/or a spring positioned otherwise along the drive shaft 86. For example, the spring may be instead positioned at a first end or at a second end of the drive shaft 86.

The actuator assembly 26 includes a controller (not shown) that controls operation of the electromagnetic actuator 98. In some embodiments, the controller receives feedback from the sensor assembly 78 and energizes or de-energizes the electromagnetic actuator 98 in response to one or more sensed conditions. For example, the controller may receive feedback from the sensor assembly 78 indicating that a fault has occurred. In response, the controller may control the electromagnetic actuator 98 to automatically open the VI assembly 18 and break the circuit. The controller may also control the electromagnetic actuator 98 to automatically close the VI assembly 18 once the fault has been cleared (e.g., as indicated by the sensor assembly 78).

In the illustrated embodiment, the actuator assembly 26 further includes a manual trip assembly 102 that can be used to manually open the VI assembly 18. The manual trip assembly 102 includes a handle 104 accessible from an exterior of the housing assembly 14 (FIG. 1). The handle 104 is rotatable to move a yoke 106 inside the housing assembly 14 (FIG. 2). The yoke 106 is engageable with a collar 110 on the output shaft 94 to move the movable contact 66 toward the open position.

Figure 3:
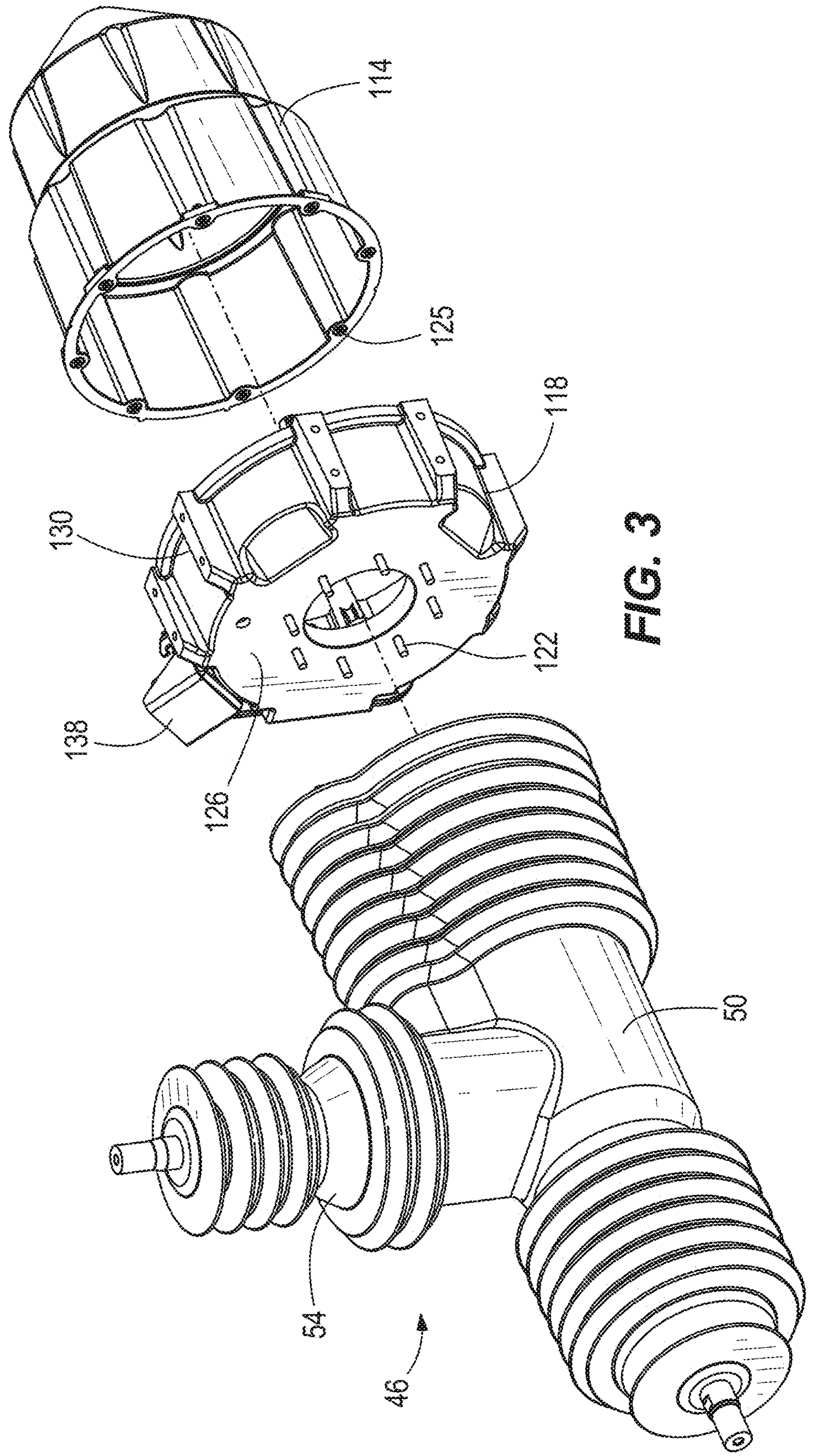
FIG. 3 is an exploded perspective view of a housing of the recloser of FIG. 1.
Figure 5:
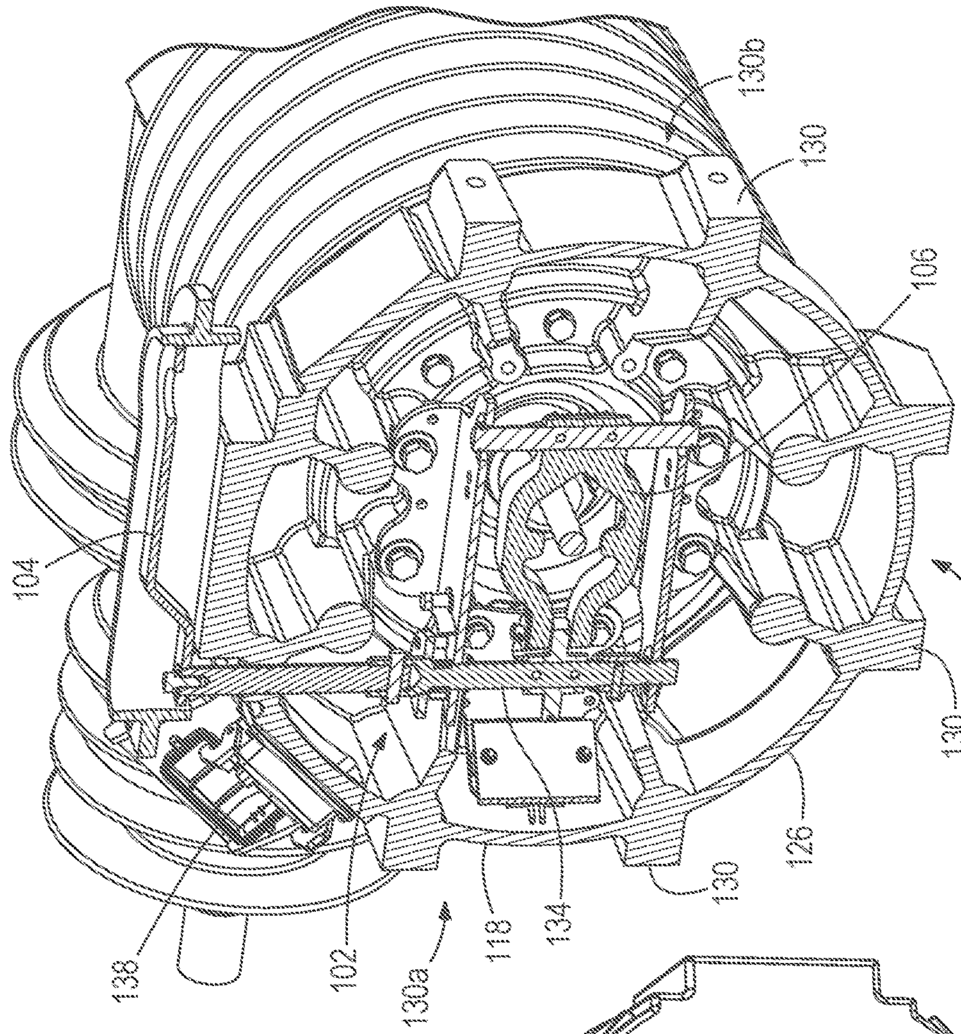
FIG. 5 is a cross-sectional view of the recloser of FIG. 1, illustrating the mount of FIG. 4.
Figure 4:
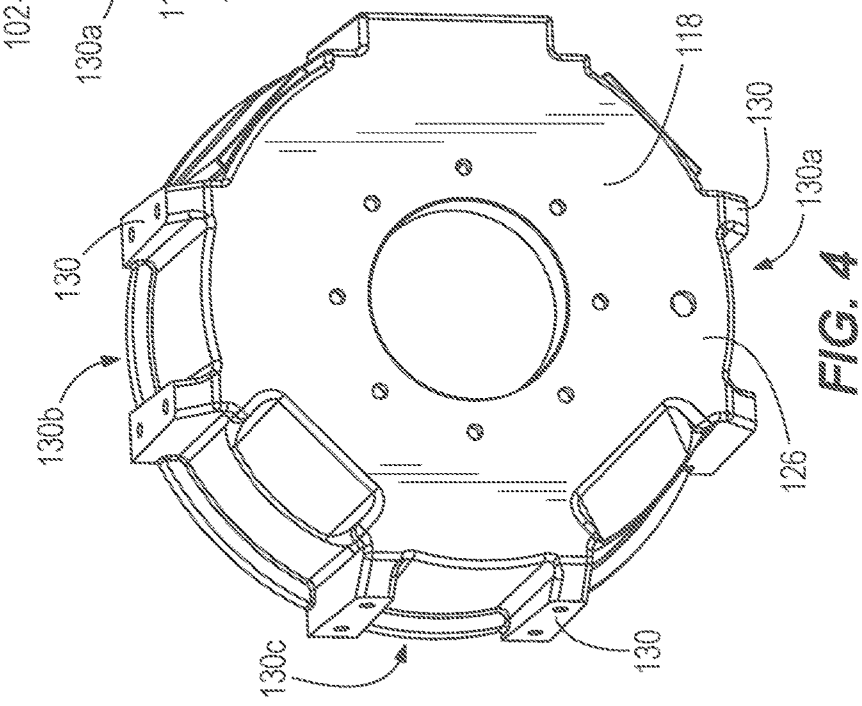
FIG. 4 is a perspective view of a mount of the recloser of FIG. 1.

Referring to FIGS. 2 and 3, the housing assembly 14 further includes an actuator housing 114 enclosing the electromagnetic actuator 98 and a mounting head 118 coupled between the actuator housing 114 and the main housing 46. In the illustrated embodiment, the mounting head 118 is coupled to the main housing 46 by a first plurality of threaded fasteners 122, and the actuator housing 114 is coupled to the mounting head 118 opposite the main housing 46 by a second plurality of threaded fasteners 125 (FIG. 3). Referring to FIGS. 4 and 5, the mounting head 118 includes a main body 126 and a plurality of mounting bosses 130 spaced along the outer periphery of the main body 126. In the illustrated embodiment, the plurality of mounting bosses 130 includes a first pair of bosses 130*a* extending from the main body 126 in a first direction, a second pair of bosses 130*b* extending from the main body 126 in a second direction opposite the first direction, and a third pair of bosses 130*c* extending from the main body 126 in a third direction orthogonal to the first and second directions. In other embodiments, the mounting head 118 may include a different number and/or arrangement of mounting bosses 130.

The mounting head 118 is couplable to the main housing 46 in a plurality of different orientations such that the pairs of bosses 130 (130*a*, 130*b*, 130*c*) may be positioned in a number of different rotational orientations about axis 34 with respect to the main housing 46. That is, the rotational orientation of the pairs of bosses 130 about the circumference of the main housing 46 may be varied as desired by rotating the orientation of the mounting head 118 and main housing 46 relative to one another about the axis 34 to a desired position before coupling the mounting head 118 and the main housing 46. In some embodiments, the mounting head 118 may be coupled to the main housing 46 in at least three different orientations. In other embodiments, the mounting head 118 may be coupled to the main housing 46 in at least six different orientations. In other embodiments, the main housing 46, the mounting head 118, and the actuator housing 114 may be coupled together in other ways (e.g., via direct threaded connections or the like).

With reference to FIG. 5, the handle 104 of the manual trip assembly 102 extends along a side of the main body 126 opposite the third pair of bosses 130*c*. The handle 104 is coupled to the yoke 106 via a shaft 134 extending through the main body 126. In the illustrated embodiment, the main body 126 of the mounting head 118 also supports a connector 138. In the illustrated embodiment, the connector 138 is positioned between the handle 104 and the first pair of bosses 130*a* along the outer periphery of the main body 126. The connector 138 is in communication with the sensor assembly 78 such that feedback from the sensor assembly 78 may be obtained by interfacing with the connector 138.

Figure 6:
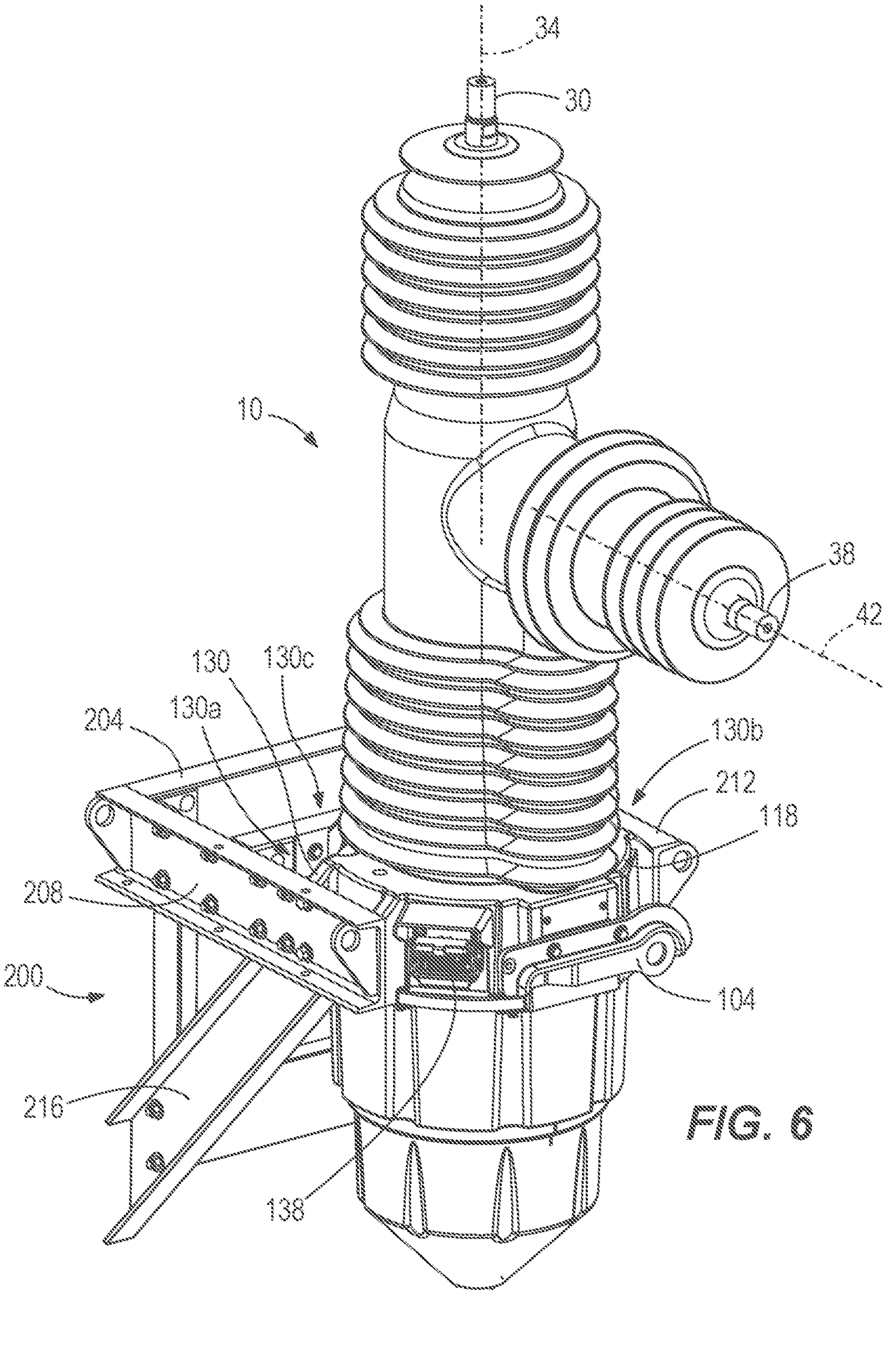
FIG. 6 is a perspective view of an assembly including the recloser of FIG. 1 coupled to a bracket in a first vertical orientation.
Figure 7A:
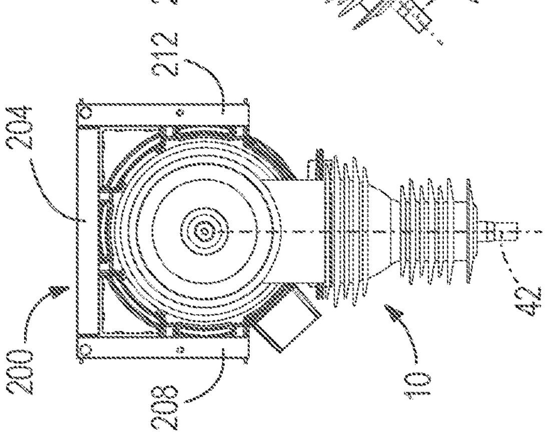
FIG. 7A is a top view of the assembly of FIG. 6.
Figure 7B:
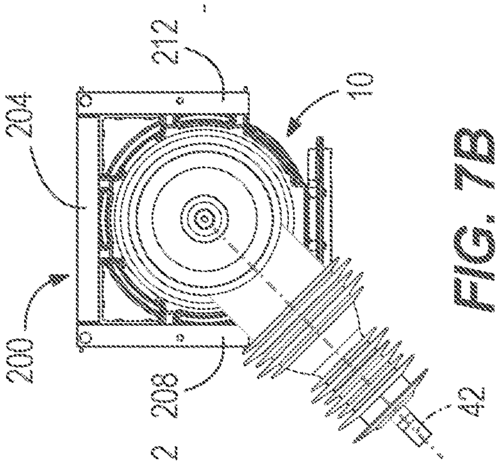
FIG. 7B is a top view of the assembly of FIG. 6 illustrating the recloser in a second vertical orientation.
Figure 7C:
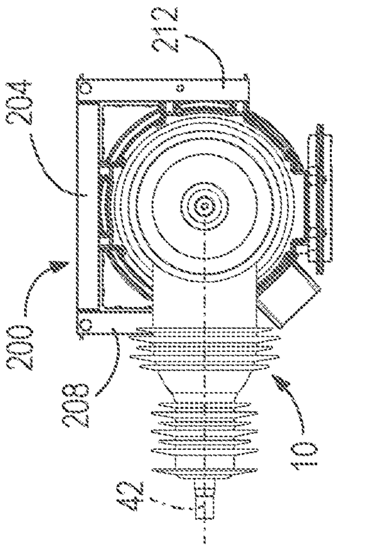
FIG. 7C is a top view of the assembly of FIG. 6 illustrating the recloser in a third vertical orientation.
Figure 7D:
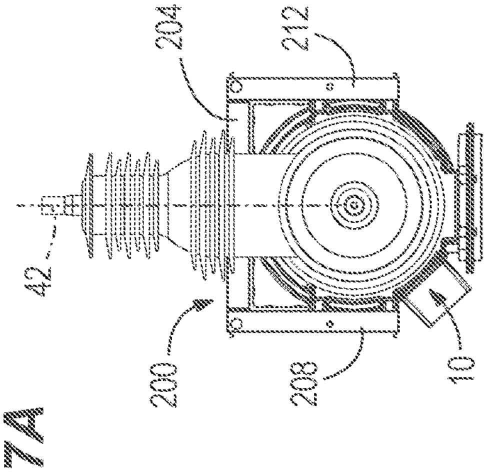
FIG. 7D is a top view of the assembly of FIG. 6 illustrating the recloser in a fourth vertical orientation.
Figure 7E:
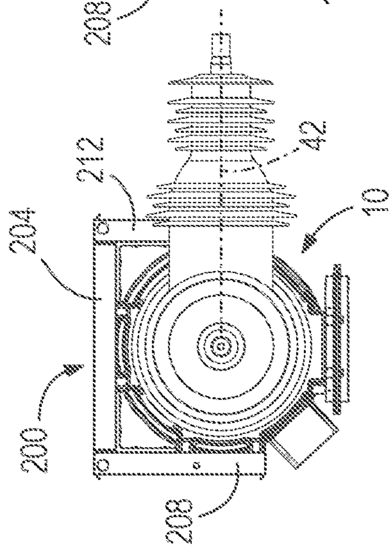
FIG. 7E is a top view of the assembly of FIG. 6 illustrating the recloser in a fifth vertical orientation.
Figure 7F:
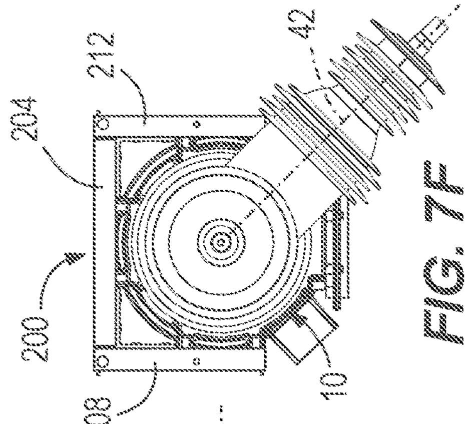
FIG. 7F is a top view of the assembly of FIG. 6 illustrating the recloser in a sixth vertical orientation.
Figure 8:
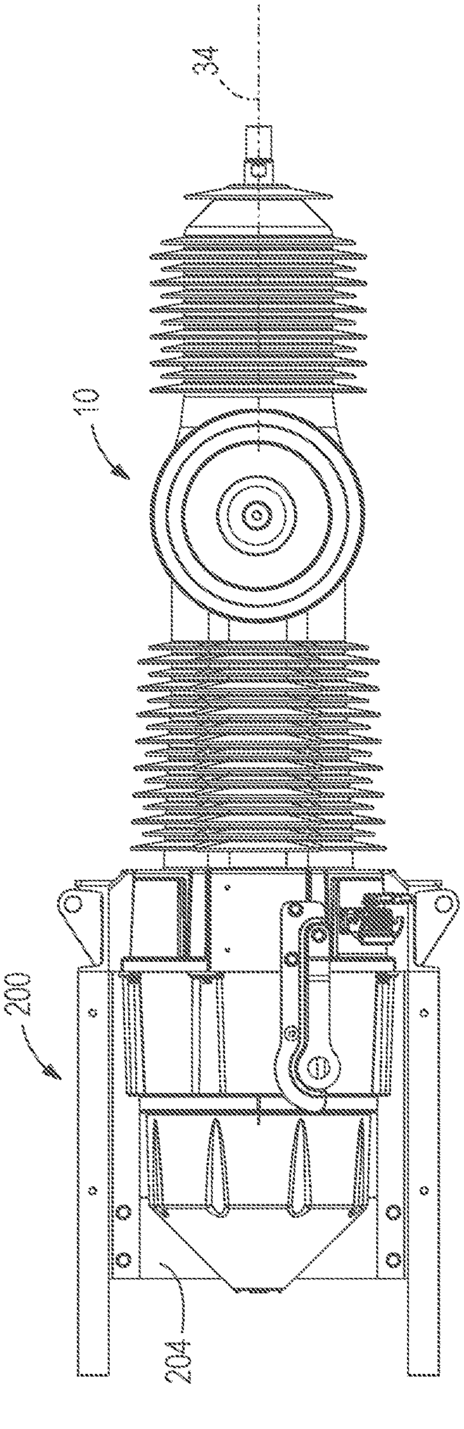
FIG. 8 is a front view of the assembly of FIG. 6 illustrating the recloser in a first horizontal orientation.
Figure 9C:
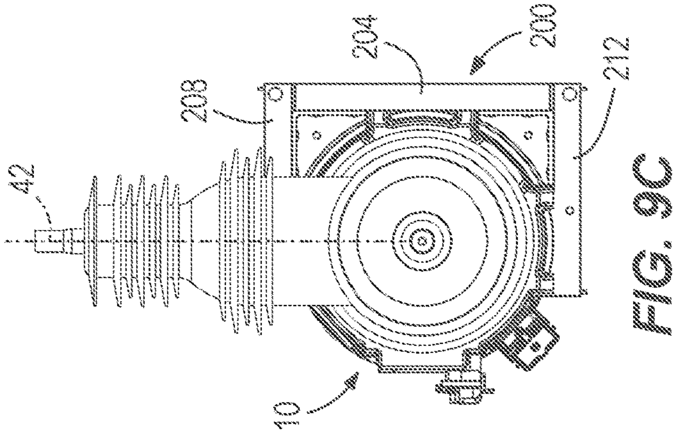
FIG. 9C is a right side view of the assembly of FIG. 6 illustrating the recloser in a third horizontal orientation.
Figure 9B:
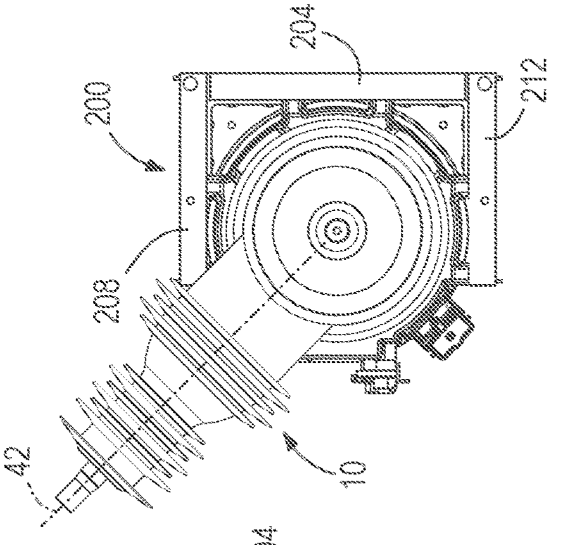
FIG. 9B is a right side view of the assembly of FIG. 6 illustrating the recloser in a second horizontal orientation.
Figure 9A:
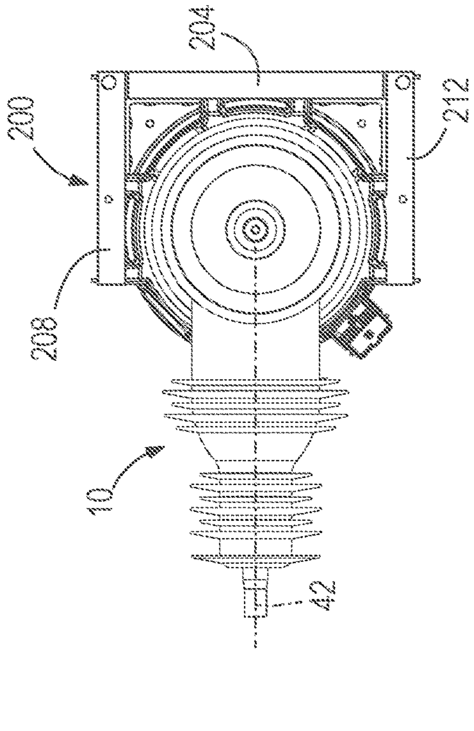
FIG. 9A is a right side view of the assembly of FIG. 8.
Figure 10:
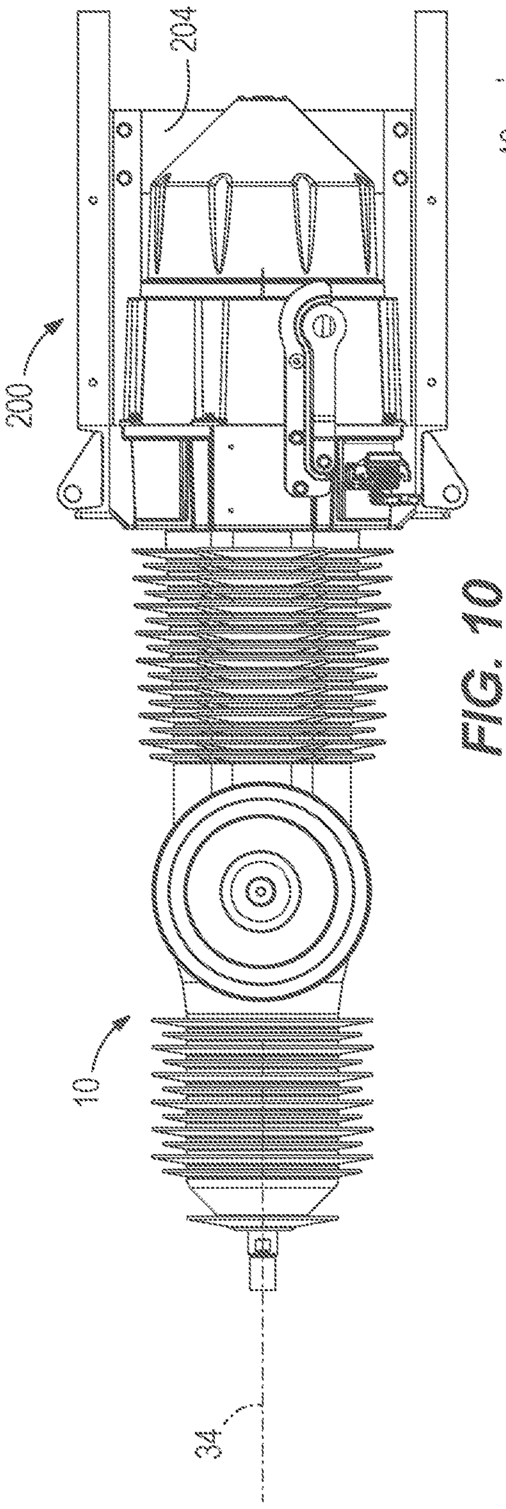
FIG. 10 is a front view of the assembly of FIG. 6 illustrating the recloser in a fourth horizontal orientation.
Figure 11C:
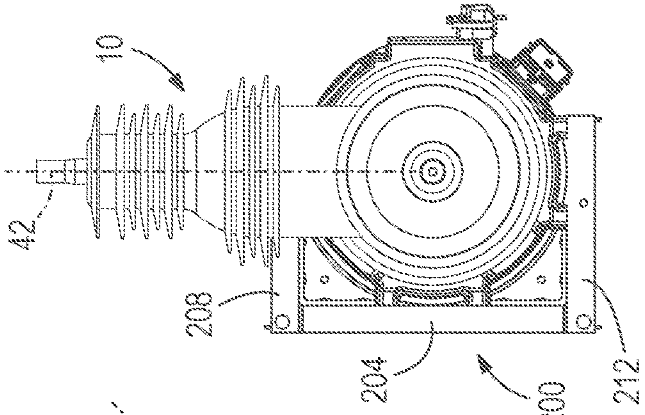
FIG. 11C is a left side view of the assembly of FIG. 6 illustrating the recloser in a sixth horizontal orientation.
Figure 11B:
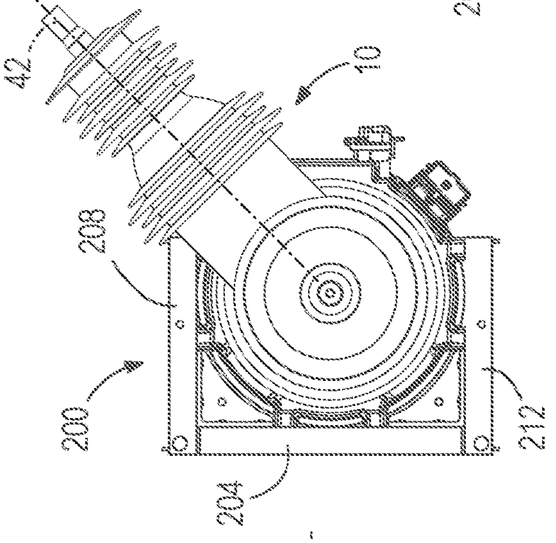
FIG. 11B is a left side view of the assembly of FIG. 6 illustrating the recloser in a fifth horizontal orientation.
Figure 11A:
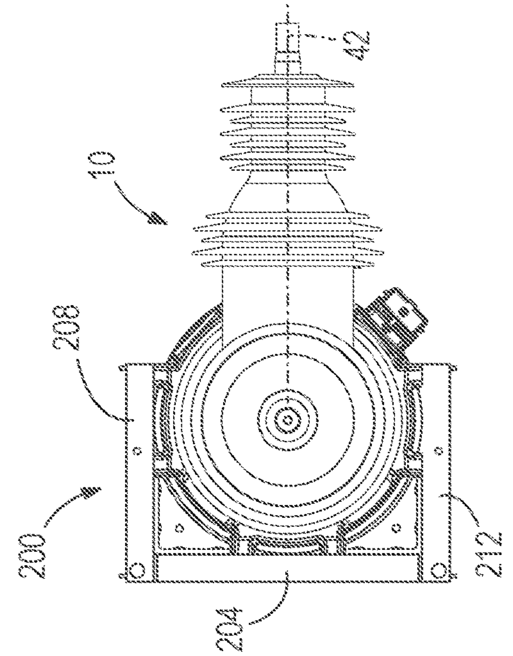
FIG. 11A is a left side view of the assembly of FIG. 10.

Referring to FIG. 6, the illustrated recloser 10 is provided with a mounting bracket 200 that interfaces with the bosses 130 on the mounting head 118 to facilitate mounting the recloser 10 in a variety of different orientations. The illustrated mounting bracket 200 includes a backing frame 204, a first arm 208 extending perpendicularly from the backing frame 204, a second arm 212 extending perpendicularly from the backing frame 204 and spaced from the first arm 208, a first brace 216 extending at an angle between the backing frame 204 and the first arm 208, and a second brace (not shown) structured and oriented in the same manner as the first brace 216 extending at an angle between the backing frame 204 and the second arm 212. As such, the illustrated mounting bracket 200 is generally U-shaped.

The recloser 10 is received within a space defined between the arms 208, 212 such that the handle 104 and connector 138 face away from the backing frame 204. As such, the handle 104 and connector 138 are easily accessible when the recloser 10 is attached to the mounting bracket 200. The first arm 208 is coupled to the first pair of bosses 130*a*, and the second arm 212 is coupled to the second pair of bosses 130*b* (e.g., with a plurality of threaded fasteners; not shown). In some embodiments, the backing frame 204 may be coupled to the third pair of bosses 130*c*, either directly or intermediate mounting hardware. Thus, the mounting bracket 200 may be attached to the mounting head 118 of the recloser 10 on three different sides to securely hold the recloser 10. In some embodiments, the backing frame 204 may not be coupled to the third pair of bosses 130*c*, such that the mounting bracket 200 and the mounting head 118 of the recloser 10 may be attached on only two different sides.

Figure 13:
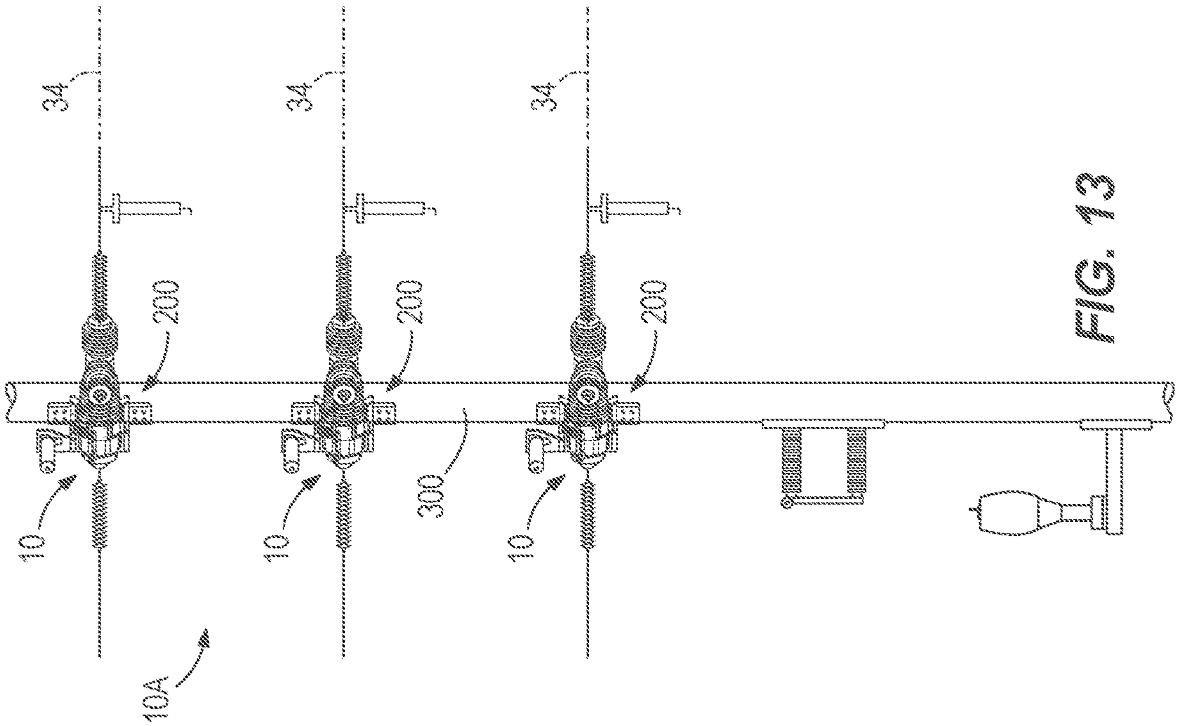
FIG. 13 illustrates a plurality of the assemblies of FIG. 8 mounted to a pole, with each recloser in the first horizontal orientation.
Figure 12:
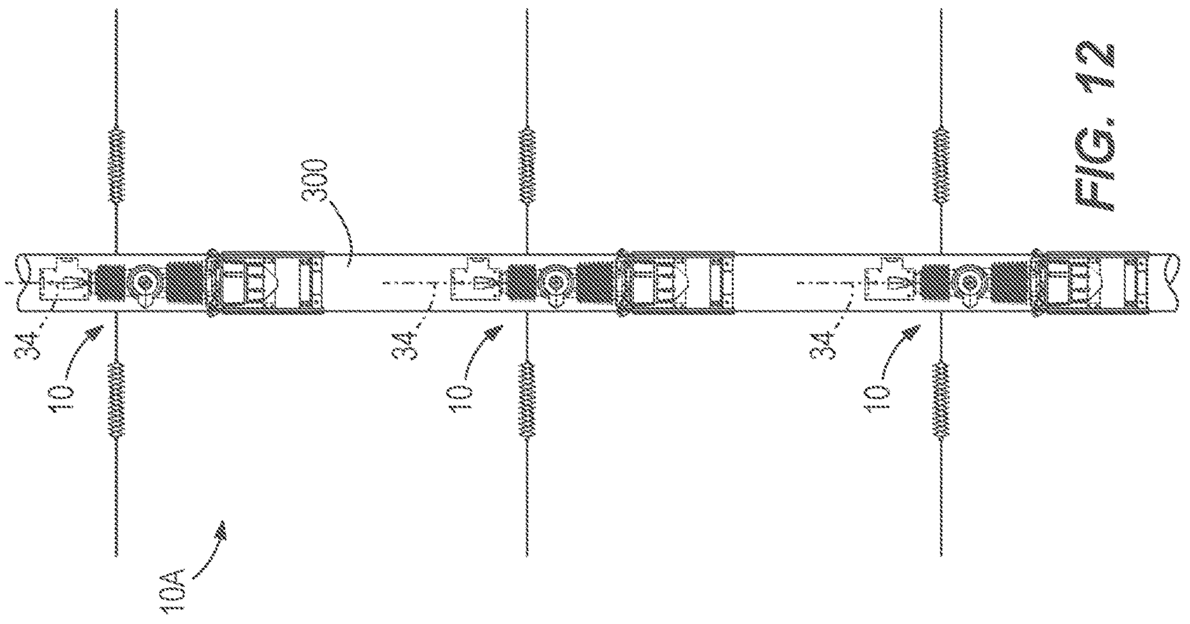
FIG. 12 illustrates a plurality of the assemblies of FIG. 6 mounted to a pole, with each recloser in the first vertical orientation.

With reference to FIGS. 12-13, the recloser 10 may be part of a recloser system 10A including three reclosers 10—each associated with a different phase of a three-phase power transmission system. The mounting bracket 200 advantageously allows each recloser 10 to be mounted to, for example, a pole 300 in a vertical orientation (FIG. 12), in which the first axis 34 is oriented generally parallel to the pole 300 and generally perpendicular to the ground, and in a horizontal orientation for the exemplary vertical pole 300 (FIG. 13), in which the first axis 34 is oriented generally perpendicular to the pole 300 and generally parallel to the ground. Of course, depending on the orientation of the pole 300, the possible varied orientations of a particular recloser 10 relative to the ground would be different from those illustrated in the exemplary embodiments of FIGS. 12 and 13. Each recloser 10 can thus be conveniently used with different wiring configurations, clearances, or spacings when mounted to a pole 300, which facilitates installation of the recloser system 10A outside of substations. The mounting bracket 200 may also be used to mount the recloser 10 in a substation in either a vertical or horizontal orientation.

With reference to FIGS. 7A-7F, the exemplary embodiment of the mounting head 118 allows the recloser 10 (specifically, the main housing 46 of the recloser 10 in some embodiments) to be coupled to the bracket 200 in at least six different rotational orientations about the first axis 34 to provide the recloser 10 with an even greater variety of mounting configurations. As explained above, the rotational orientation about first axis 34 in which the mounting head 118 can be coupled to the main housing 46 can be varied. In other embodiments, the rotational orientation of the second axis 42 and the second terminal 38 of the recloser 10 can be varied relative to the mounting bracket 200 by coupling the mounting head 118 to the mounting bracket 200 in different rotational orientations about the first axis 34. Thus, the orientation of the second axis 42 (and thus, the second terminal 38) of the recloser 10 can be varied relative to the mounting bracket 200 to facilitate making connections to the second terminal 38.

For example, in the illustrated embodiment, the recloser 10 can be mounted in a first orientation (FIG. 7A) in which the second axis 42 and second terminal 38 are perpendicular to the backing frame 204, a second orientation (FIG. 7B) in which the second axis 42 and second terminal 38 are offset 45 degrees from the first orientation, a third orientation (FIG. 7C) in which the second axis 42 and second terminal 38 are offset 90 degrees from the first orientation, a fourth orientation (FIG. 7D) in which the second axis 42 and second terminal 38 are offset 180 degrees from the first orientation, a fifth orientation (FIG. 7E) in which the second axis 42 and second terminal 38 are offset 270 degrees from the first orientation, and a sixth orientation (FIG. 7F) in which the second axis 42 and second terminal 38 are offset 315 degrees from the first orientation.

Referring to FIGS. 8-11C, the orientation of the mounting bracket 200 may also be varied to change the orientation of the first terminal 30 of the recloser 10 (e.g., from vertical to horizontal) to facilitate making connections to the first terminal 30. For example, in the illustrated embodiment, the recloser 10 can be mounted in a first plurality of orientations (FIGS. 8-9C) with the first terminal 30 extending in a first direction (i.e. to the right in FIG. 8), and the recloser 10 can be mounted in a second plurality of orientations (FIGS. 10-11C) with the first terminal 30 extending in a second direction (i.e. to the left in FIG. 10) opposite the first direction. In each case, the recloser 10 can be mounted in at least first orientation (FIG. 9A and FIG. 11A) in which the second axis 42 and the second terminal 38 are perpendicular to the backing frame 204, a second orientation (FIG. 9B and FIG. 11B) in which the second axis 42 and second terminal 38 are offset 45 degrees from the first orientation, and a third orientation (FIG. 9C and FIG. 11C) in which the second axis 42 and second terminal 38 are offset 90 degrees from the first orientation.

Figure 14:
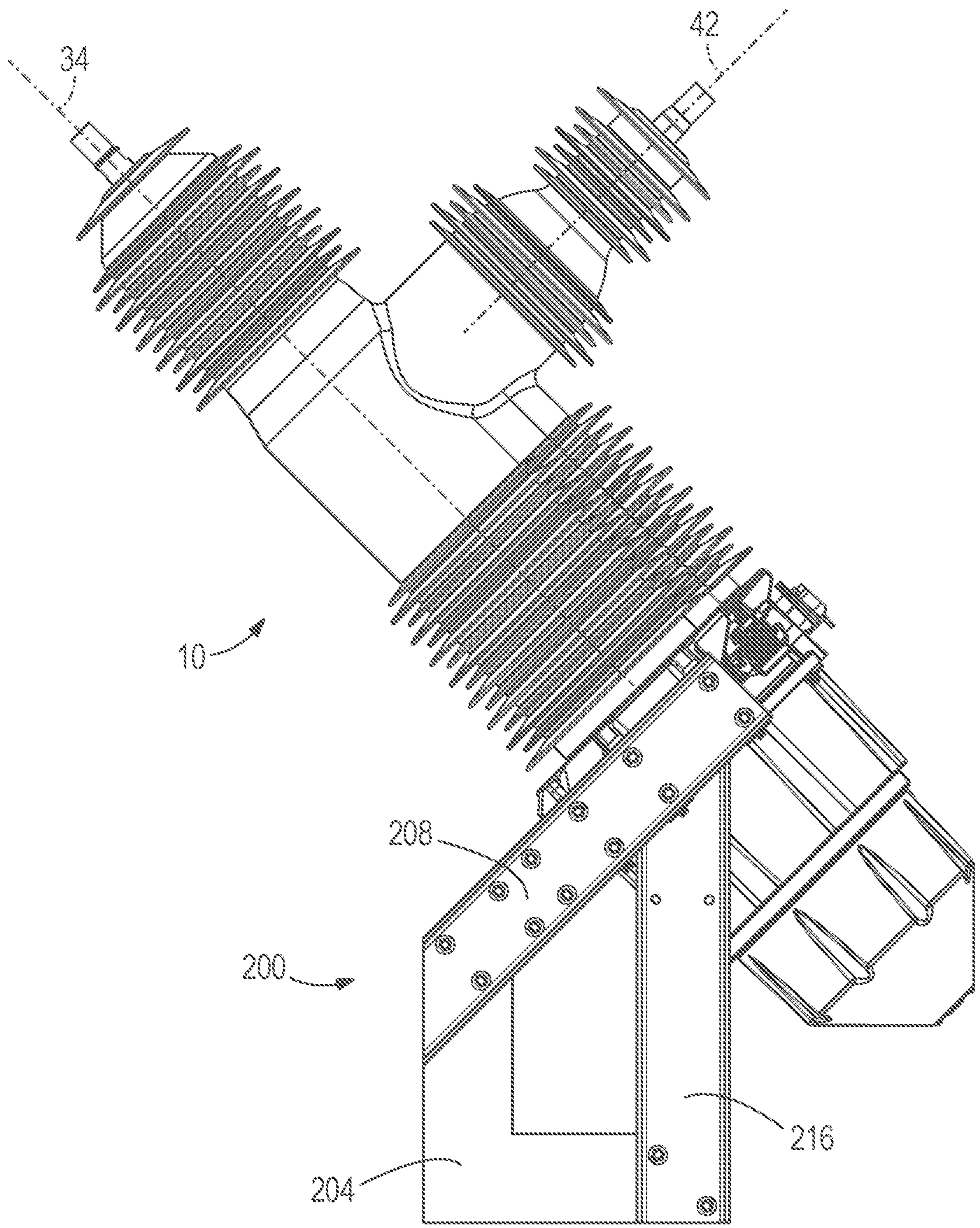
FIG. 14 is a side view of an assembly according to another embodiment, the assembly including a bracket and a recloser coupled to the bracket in an angled orientation.

With reference to FIG. 14, in some embodiments, the mounting bracket 200 may be configured to support the recloser 10 such that the first axis 34 is oriented at an angle relative to the backing frame 204 and the horizontal and vertical directions. For example, the embodiment illustrated in FIG. 14, the mounting bracket 200 supports the recloser 10 such that the first axis 34 is angled at 45 degrees relative to vertical. In such embodiments, the backing frame 204 may have an L-shape to facilitate mounting the backing frame 204 to a pole, a concrete pad, or the like.

Thus, the present disclosure provides a high voltage recloser 10 suitable for use in power transmission applications up to 72.5 kV. The recloser 10 includes a mounting head 118 and mounting bracket 200 that allow the recloser 10 to be mounted on a pole or at a substation in a variety of different vertical, horizontal, and angled orientations. That is, the recloser 10 can be assembled to suit a wide variety of different applications, which may provide significant cost savings and manufacturing efficiency.

Various features and advantages of the invention are set forth in the following claims.

What is claimed is:

1. A switchgear apparatus and mounting bracket assembly comprising:

a switchgear apparatus including a vacuum interrupter assembly having a movable contact and a stationary contact, a main housing surrounding the vacuum interrupter assembly, a first terminal electrically coupled to one of the movable contact and the stationary contact, the first terminal extending from the main housing along a first axis, a second terminal electrically coupled to the other of the movable contact and the stationary contact, the second terminal extending from the main housing along a second axis, and a mounting head selectively couplable to the main housing in a plurality of orientations about the first axis; and a mounting bracket selectively couplable to the mounting head.

2. The switchgear apparatus and mounting bracket assembly of claim 1, further comprising an actuator assembly configured to move the movable contact relative to the stationary contact, and an actuator housing at least partially enclosing the actuator assembly.

3. The switchgear apparatus and mounting bracket assembly of claim 2, wherein the actuator housing is coupled to the mounting head opposite the main housing.

4. The switchgear apparatus and mounting bracket assembly of claim 2, wherein the actuator assembly includes an electromagnetic actuator and a manual trip assembly, wherein the manual trip assembly includes a handle and a shaft coupled to the handle, and wherein the shaft extends through the mounting head.

5. The switchgear apparatus and mounting bracket assembly of claim 1, wherein the mounting bracket is configured to couple the switchgear apparatus to a pole.

6. The switchgear apparatus and mounting bracket assembly of claim 1, wherein the mounting head includes a first pair of mounting bosses, a second pair of mounting bosses, and a third pair of mounting bosses, wherein the mounting bracket includes a first arm coupled to the first pair of mounting bosses and a second arm coupled to the second pair of mounting bosses, and wherein the mounting bracket includes a backing frame coupled to the third pair of mounting bosses.

7. The switchgear apparatus and mounting bracket assembly of claim 6, wherein the first arm is spaced from the second arm, and wherein each of the first and second arms extends perpendicular to the backing frame.

8. The switchgear apparatus and mounting bracket assembly of claim 6, wherein the first axis is angled relative to the backing frame.

9. A switchgear apparatus and mounting bracket assembly comprising:

a mounting bracket; and a switchgear apparatus including a vacuum interrupter assembly having a movable contact and a stationary contact, a main housing surrounding the vacuum interrupter assembly, a first terminal electrically coupled to one of the movable contact and the stationary contact, the first terminal extending from the main housing along a first axis, a second terminal electrically coupled to the other of the movable contact and the stationary contact, the second terminal extending from the main housing along a second axis, and a mounting head configured to be coupled to the mounting bracket such that the mounting bracket is configured to at least partially support the switchgear apparatus via the mounting head, wherein the switchgear apparatus is configurable to position at least one of the first axis or the second axis in a plurality of different orientations with respect to the mounting bracket when the mounting head is coupled to the mounting bracket.

10. The switchgear apparatus and mounting bracket assembly of claim 9, wherein the mounting head includes a plurality of pairs of mounting bosses, wherein each pair of the plurality of pairs of mounting bosses is spaced apart from each of the other pairs of plurality of pairs of mounting bosses about a perimeter of the mounting head, and wherein each pair of the plurality of pairs of mounting bosses is configured to be coupled to the mounting bracket.

11. The switchgear apparatus and mounting bracket assembly of claim 9, wherein the mounting head includes a first pair of mounting bosses, a second pair of mounting bosses, and a third pair of mounting bosses, wherein the mounting bracket includes a first arm coupled to the first pair of mounting bosses and a second arm coupled to the second pair of mounting bosses, and wherein the mounting bracket includes a backing frame coupled to the third pair of mounting bosses.

12. The switchgear apparatus and mounting bracket assembly of claim 9, wherein the switchgear apparatus is configurable to position each of the first axis and the second axis in a plurality of different orientations with respect to the mounting bracket when the mounting head is coupled to the mounting bracket.

13. The switchgear apparatus and mounting bracket assembly of claim 9, wherein the main housing is constructed of a solid dielectric material.

14. The switchgear apparatus and mounting bracket assembly of claim 9, wherein the mounting head and the mounting bracket are each configured such that the mounting head can be selectively coupled to the mounting bracket to vary an orientation of the first terminal relative to the mounting bracket between a first orientation in which the first terminal extends from the mounting bracket in a first direction and a second orientation in which the first terminal extends from the mounting bracket in a second direction opposite from the first direction.

15. The switchgear apparatus and mounting bracket assembly of claim 9, wherein the first axis and the second axis are perpendicular.

16. The switchgear apparatus and mounting bracket assembly of claim 9, wherein the mounting head is coupleable to the main housing in a plurality of different rotational positions, and wherein each of the plurality of different rotational positions corresponds with one of the plurality of different orientations when the mounting head is coupled to the mounting bracket.

17. The switchgear apparatus and mounting bracket assembly of claim 9, wherein the switchgear apparatus is operable at voltages up to at least 72.5 kV.

18. The switchgear apparatus and mounting bracket assembly of claim 9, wherein the mounting bracket is configured to mount the switchgear apparatus to a pole.

19. The switchgear apparatus and mounting bracket assembly of claim 9, wherein the switchgear apparatus includes an actuator assembly configured to move the movable contact relative to the stationary contact, and an actuator housing at least partially enclosing the actuator assembly, wherein the mounting head is coupled between the main housing and the actuator housing, and wherein the mounting head is configured to selectively position the main housing in a plurality of different orientations about the first axis relative to the actuator housing.

20. A switchgear apparatus comprising:

a vacuum interrupter assembly having a movable contact and a stationary contact;

a main housing surrounding the vacuum interrupter assembly;

an actuator assembly configured to move the movable contact relative to the stationary contact;

an actuator housing at least partially enclosing the actuator assembly;

a first terminal electrically coupled to the stationary contact, the first terminal extending from the main housing along a first axis;

a second terminal electrically coupled to the movable contact, the second terminal extending from the main housing along a second axis; and a mounting head coupled between the main housing and the actuator housing, wherein the mounting head is configured to selectively position the main housing in a plurality of different orientations about the first axis relative to the actuator housing.

* * * * *